Feb. 20, 1951
A. H. PROW
2,542,702
DIELECTRIC HEAT SEALER
Filed May 29, 1947
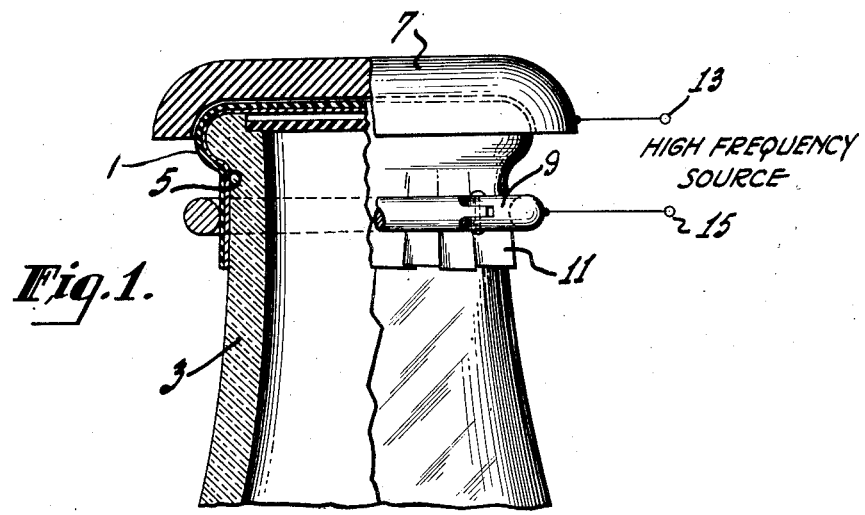
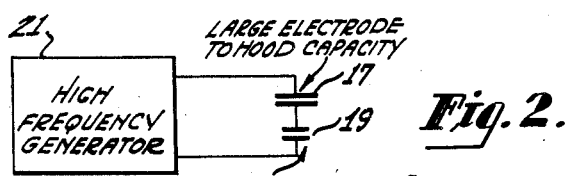
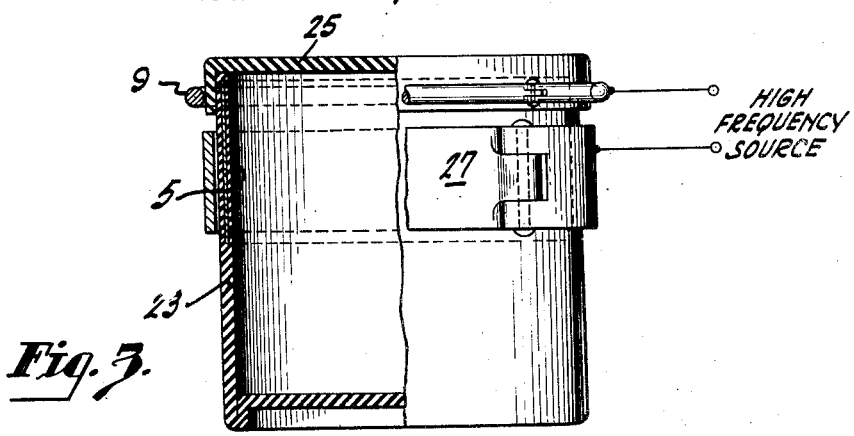
Inventor
ALBERT H. PROW
By
Attorney Patented Feb. 20, 1951

2,542,702

UNITED STATES PATENT OFFICE 2,542,702

DIELECTRIC HEAT SEALER

Albert H. Prow, Lakewood, Ohio, assignor to Radio Corporation of America, a corporation of Delaware Application May 29, 1947, Serial No. 751,387

5 Claims. (Cl. 219—47)

This invention relates to radio frequency heat sealing devices, and in particular to a method of and means for activating or setting a dielectric adhesive by radio frequency energy to seal the closure of a dielectric container without heating the contents of the container.

The principle utilized in generating heat within thermo-setting or thermo-plastic dielectric materials which are subjected to an intense electric field is well known. In general, heating is effected (a) by placing the material between two electrodes which are connected to a suitable source of high frequency alternating potential, in the manner illustrated in Patent No. 2,372,929, issued April 3, 1945, to G. W. Blessing, or (b) by placing the two electrodes side by side against one surface of the material as shown, for example, in the German Patent No. 516,783, of May 2, 1928.

In attempting to utilize either of these methods in heat sealing the closure of a non-conducting container such as a milk bottle or a paper container of the type commonly employed to hold ice cream and similar food products, it has been found that the former method is impractical since it would be necessary to make an electrical connection to an electrode within the container, while both methods have the disadvantage that the electric field heats the contents of the container. This heating is objectionable because it may tend to accelerate the growth of molds and bacteria, and also because the heat lost through absorption by the contents of the container serves no useful purpose and makes it necessary to employ a larger generator than would otherwise be necessary.

It is, therefore, the primary object of this invention to provide an improved method of and apparatus for heat sealing non-conducting containers such as milk bottles, paper cartons and the like.

It is a further object of this invention to provide an improved method of and means for concentrating the heating field in the area of the closure to be sealed. A further object is to improve the efficiency of heat sealing apparatus.

The foregoing and related objects are achieved in accordance with this invention by impregnating the closure, or the container, or both, with a suitable heat activatable adhesive. A layer of conducting material is provided inside the closure or within the walls of the container adjacent the region to be sealed and extending beyond this region far enough to provide adequate electrostatic or capacity coupling to the first of the two electrodes at a point more or less remote from the point where it is desired to concentrate the heat. The second electrode is placed around the container at the sealing point so that the adhesive and the closure are between it on a portion of the conducting layer. When a high frequency voltage is applied to the two electrodes, there is substantially no heat developed between the layer and the first electrode, while substantially all the heat is developed between the layer and the second electrode, while the layer effectively shields the contents of the container from the electric field.

Other objects and advantages will be apparent and the invention itself will best be understood by reference to the following specification and to the accompanying drawing, wherein:

Figure 1 is a view partly in section of an embodiment of this invention;

Figure 2 is a circuit diagram for explaining the invention, and

Figure 3 is a view, partly in section, of an alternative embodiment of this invention.

One form of the invention, illustrated in Fig. 1, contemplates heat sealing the pleated hood 1 of a milk bottle 3. The pleated hood or closure is of the conventional type except that its inner surface is covered with a conductive layer 5. This may be a thin metal foil or any similar conductor deposited on or attached to the closure in any desired manner. The first electrode 7 is preferably in the form of a metal plate or cap which may be placed over or against the top of the hood so that there is a relatively large capacity between the electrode and the adjacent conductive layer inside the hood.

The second electrode 9 is preferably annular in shape, hinged at one point 11 and open at the diametrically opposite point so that it can be opened up to facilitate its being placed in position around the narrow neck of the bottle. This electrode should have a relatively low capacity to the conductive layer, say of the order of one-tenth of the capacity between the layer and the first electrode. This is accomplished by making the conductor of small diameter, so as to concentrate the field in a small area of the material to provide an intense heating effect. The two electrodes are provided with any suitable terminals 13 and 15 for connection to the source of radio frequency energy not shown. The frequency and voltage used are substantially dependent upon the dimensions and spacing of the electrodes, speed of operation desired, and type of thermosetting glue used. These may be readily determined by anyone well versed in the radio frequency dielectric heating art.

In case the invention is to be applied to an automatic capping machine, the electrodes may conveniently be combined with the capping mechanism. The crimper which folds the pleats of the closure hood may be electrically insulated from the body of the apparatus and serve a dual purpose. Since the specific design will depend on the apparatus used, and will be understood by those skilled in the art, further description of this arrangement is not necessary.

Fig. 2 illustrates the manner of operation of this invention. The large capacitor 17 represents the capacity between the first electrode 7 and the conductive layer 5. The small capacitor 19 represents the capacity between the second electrode 9 and the conductive layer 5. It is noted that these two capacitances are effectively in series across the generator 21. Now it is well known that capacitors in series act as a voltage divider, the total generator voltage appearing across the two capacitors in inverse proportion to their capacities. Consequently, there will be a relatively low voltage between the electrodes of the large capacitor and a high voltage between the electrodes of the small capacitor. Applied to the arrangement shown in Fig. 1, a relatively small alternating potential difference will exist between the large electrode 7 and the conductive layer, and there will be relatively little heat developed per unit area in this region. Thus the large electrode serves primarily as a means for coupling the conductive layer to the generator without the necessity of making a direct contact. However, an intense field is produced in the region immediately between the small electrode 9 and the adacent region of the layer. This field activates the adhesive and seals the pleated hood securely in place.

It should be noted that the metallic layer inside the pleated hood effectively shields the contents of the bottle from the electric field. The efficiency of heating is high because stray fields do not permeate the bottle or the milk, and the heating field is concentrated at the precise point where it is needed.

An alternative embodiment is shown in Fig. 3. This arrangement is particularly useful where the lid of a cardboard container is to be sealed to the body portion to effect a permanent water and air-tight seal. In this case the metal foil 5, or equivalent conductive layer, is included within the thickness of the container wall 23. This is, of course, easy to accomplish during the process of manufacture, and involves substantially no additional cost. The foil, assuming foil to be used, should extend from the open edge of the container to a point somewhat below the limit of the lid 25 or closure portion, say two inches.

The first or coupling electrode 27 is, in this case, annular in shape, and hinged to provide means for removing it readily from the container. Its width determines the capacity to the foil, and should be sufficiently large that, for the operating voltage needed, substantially no heating effect is produced. The second electrode 9 is a split ring, hinged as in the preceding illustration, and adapted to be positioned about the circumference of the closure. Both electrodes are connected to a radio frequency generator as in the preceding illustration.

An intense electric field is concentrated in the region directly under the second electrode 9. This will activate the thermo-plastic or thermo-setting adhesive with which the closure and/or the container body have been impregnated to effect a tight seal. As before, the contents are shielded by the foil, and thus protected from spoilage or damage.

What I claim is:

1. Dielectric heating apparatus for sealing a container consisting of dielectric body and closure portions one of which includes a layer of conductive material which extends over both a region to be sealed and an adjacent region and which also includes a heat activatable adhesive, said apparatus comprising a first electrode adapted to be capacitively coupled to said material over a relatively wide area of said adjacent region, a second electrode adapted to be capacitively coupled to said material over a relatively narrow area of said region to be sealed, said heat activatable adhesive being between said material and said second electrode, and means for connecting said electrodes to a source of radio frequency energy, the energy supplied by said source causing activation of said adhesive at said region to be sealed.

2. Dielectric heating apparatus for sealing a container consisting of dielectric body and closure portions, said closure portions including a layer of electrically conductive material extending over a relatively narrow region of said closure to be sealed and over a relatively wide adjacent region, and a heat activatable adhesive at said region to be sealed, said apparatus comprising a first, relatively wide, electrode adapted to be capacitively coupled to said layer at said adjacent region, a second relatively narrow electrode adapted to be capacitively coupled to said layer at said region to be sealed, said heat activatable adhesive being between said layer and said second electrode, and means for connecting said electrodes to a source of radio frequency energy, the energy supplied by said source causing activation of said adhesive at said region of said closure to be sealed.

3. Apparatus of the character described in claim 2 in which said layer of electrically conductive material lies between the contents of said container and said electrodes so as to effectively shield said contents from the electric field produced between said electrodes and said layer.

4. Dielectric heating apparatus for heat sealing a container consisting of dielectric body and closure portions while maintaining the contents of said container cool, said container including a layer of electrically conducting material positioned within said closure portion and a heat activatable adhesive, said apparatus comprising a first electrode adapted to be capacitively coupled to a substantial area of said layer, a second electrode spaced from said first electrode surrounding said container and adapted to be capacitively coupled to a separate and relatively smaller area of said layer extending around said closure portion, said heat activatable adhesive being between said second electrode and said layer, and connecting means for connecting said electrodes with a source of radio frequency energy, the energy supplied by said source causing activation of said adhesive and sealing of said container.

5. Apparatus of the character described in claim 4 in which said layer of electrically conducting material is within the walls of the body portion of said container instead of within said closure portion.

ALBERT H. PROW.

REFERENCES CITED

The following references are of record in the file of this patent:

UNITED STATES PATENTS

| Number | Name | Date |
| --- | --- | --- |
| 2,222,615 | Hart | Nov. 26, 1940 |
| 2,321,131 | Crandell | June 8, 1943 |
| 2,397,615 | Mittlemann | Apr. 2, 1946 |
| 2,429,255 | Ashley | Oct. 21, 1947 |
| 2,453,185 | Bilhuber | Nov. 9, 1948 |
| 2,467,133 | Irons | Apr. 12, 1949 |

OTHER REFERENCES

RCA Radio Service News, Apr. 1944, page 4.